(12) United States Patent
DeBusk

(10) Patent No.: US 7,074,330 B1
(45) Date of Patent: Jul. 11, 2006

(54) PLANT BIOMASS MANAGEMENT SYSTEM AND METHOD

(76) Inventor: Thomas A. DeBusk, 3208 Westchester Dr., Cocoa, FL (US) 32926

( * ) Notice: Subject to any disclaimer, the term of this patent is extended or adjusted under 35 U.S.C. 154(b) by 90 days.

(21) Appl. No.: 10/770,184

(22) Filed: Feb. 2, 2004

Related U.S. Application Data

(60) Provisional application No. 60/446,014, filed on Feb. 6, 2003.

(51) Int. Cl.
*C02F 3/32* (2006.01)
*B09C 1/00* (2006.01)

(52) U.S. Cl. .................... 210/602; 210/747; 210/170; 405/128.15

(58) Field of Classification Search ............ 210/602, 210/631, 747, 170, 252, 259; 405/36, 128.15
See application file for complete search history.

(56) References Cited

U.S. PATENT DOCUMENTS

| | | | | |
|---|---|---|---|---|
| 4,188,154 A * | 2/1980 | Izatt | ......................... | 405/43 |
| 5,282,694 A * | 2/1994 | Kovacs et al. | ............... | 405/36 |
| 5,472,472 A * | 12/1995 | Northrop | ........................ | 71/9 |
| 5,520,253 A * | 5/1996 | Kesting | ...................... | 172/125 |
| 5,863,433 A * | 1/1999 | Behrends | .................... | 210/602 |
| 5,897,946 A * | 4/1999 | Nachtman et al. | .......... | 428/323 |
| 6,322,699 B1 * | 11/2001 | Fernandez | .................. | 210/602 |
| 6,893,567 B1 * | 5/2005 | Vanotti et al. | .............. | 210/605 |

OTHER PUBLICATIONS

"Lake Apopka Water Hyacinth Demonstration Project", Second Semi-Annual Report, May 1989-May 1990, AMASEK, 1991, pp. 1-9, Tables 17-20 and 25-29, Figures 11-14.*

"Effectiveness of Mechanical Aeration in Floating Aquatic Macrophyte-Based Wastewater Treatment Systems", DeBusk et al., Journal of Environment Quality, vol. 18, No. 3, Jul.-Sep. 1989, pp. 345-354.*

"Biophysical Characterization of Floating Wetlands (Flotant) and Vegetative Succession of A Warm-Temperate Aquatic Ecosystem", Mark W. Clark, 2000, pp. v-vi, 1-3, 7, 9-11, 26, 32-33, 91 and 93-95.*

"In Situ Removal of Dissolved Phosphorus in Irrigation Drainage Water by Planted Floats: Preliminary Results from Growth Chamber Experiment", Wen et al., Agriculture, Ecosystems and Environment, vol. 90, 2002, pp. 9-15.*

"Roles of Water Hyacinths and Their Roots for Reducing Algal Concentration in the Effluent from Waste Stabilization Ponds", Kim et al., Water Research, vol. 34, No. 13, 2000, pp. 3285-3294.*

* cited by examiner

*Primary Examiner*—Fred G. Prince
(74) *Attorney, Agent, or Firm*—Allen, Dyer, Doppelt, Milbrath & Gilchrist, P.A.

(57) ABSTRACT

A method for managing plant biomass in a wetland containing floating macrophytes includes the steps of draining a body of water having wetland plants growing thereon and permitting the plants to dry. The dried plant matter is then tilled into the bed of the water body, along with a coagulant. The body of water is then re-flooded, and another remediation cycle begun. In a particular embodiment the bed of the body of water has a first depth over a first area of the bed and a second depth greater than the first depth over a second area of the bed. Drainage is to a depth sufficient to expose the first area and leave depressions above the second area at least partially filled, plants in the depressions serving to re-inoculate the wetland upon reflooding.

11 Claims, 1 Drawing Sheet

PLANT BIOMASS MANAGEMENT SYSTEM AND METHOD

CROSS-REFERENCE TO RELATED APPLICATION

This application claims priority to provisional patent application Ser. No. 60/446,014, "Plant Biomass Management System and Method," filed Feb. 6, 2003.

BACKGROUND OF THE INVENTION

1. Field of the Invention

The present invention relates to remediation of bodies of water, and, more particularly, to wetland technologies for such remediation.

2. Description of Related Art

In order to remove nutrients from a body of water, it is known in the art to use macrophytes, that is, wetland plants, the root zones of which remove these nutrients from the water body. The macrophyte vegetation takes up the soluble nutrients as a function of their growth.

However, these macrophytes tend to grow very quickly, and must be harvested periodically from the body of water. Although many ideas have been presented for the disposal and alternate use of this biomass, none has to date proved commercially viable.

SUMMARY OF THE INVENTION

The present invention addresses the need for wetland biomass disposal with a method for managing the biomass. The method comprises the steps of draining a body of water having wetland plants growing thereon and permitting the plants to dry. The dried plant matter is then tilled into the soil underlying the water body. At this time, a coagulant may be added to the soil to help sequester the entrained nutrients. The body of water is then re-flooded.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
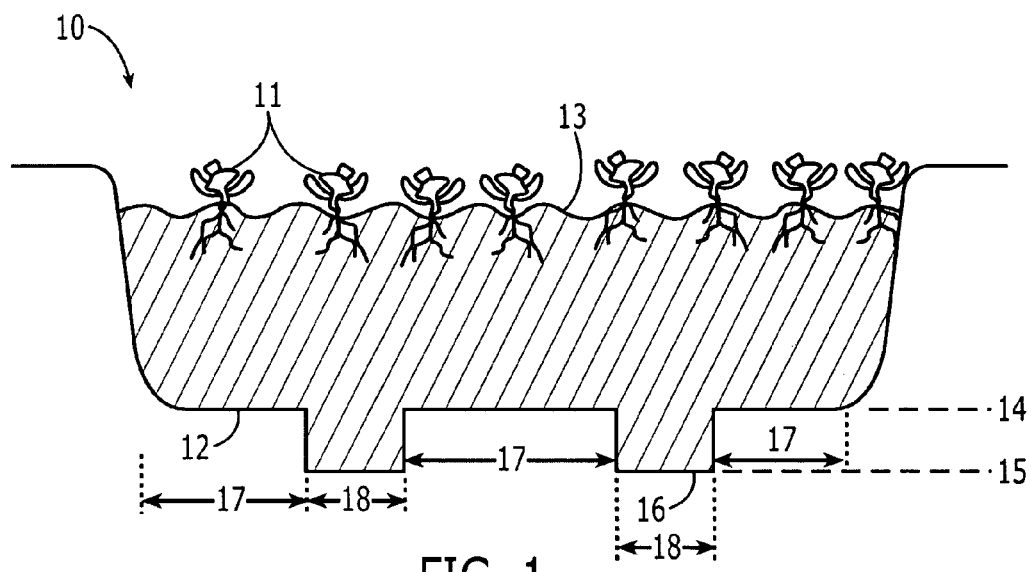
FIG. 1 is a side cross-sectional view of a wetland having plants growing on the surface.
Figure 2:
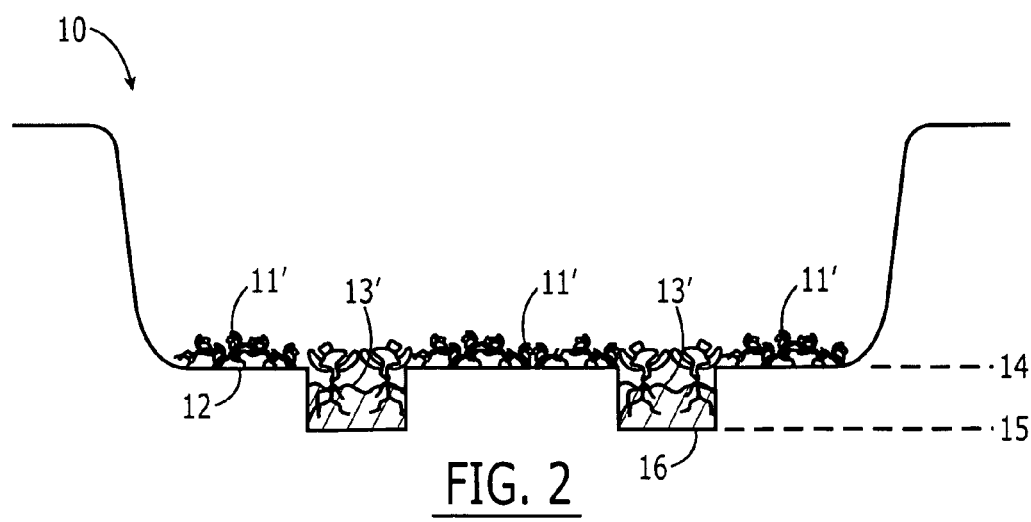
FIG. 2 is a side cross-sectional view of the nearly drained wetland.

A description of the preferred embodiments of the present invention will now be presented with reference to FIGS. 1 and 2.

The present invention addresses a method for managing macrophytic biomass in a constructed wetland 10. The wetland 10 includes a body of water containing pollutants that are desired to be removed with the use of floating or submerged vegetation 11. The wetland 10 has a bed 12 and a water surface 13 (FIG. 1). The vegetation 11 is permitted to grow until harvesting is desired. The bed 12 typically comprises a soil-type bottom, which is not intended as a limitation, and the word "soil" is intended to subsume all "natural," tillable enclosure bottoms such as, but not intended to be limited to, sand and silt.

When the vegetation 11 becomes too dense, the wetland 10 is drained (FIG. 2), and the plants 11 are permitted to dry 11'. In a preferred embodiment, the bed 12 has an uneven depth, with a first depth 14 throughout a first area 17 including most of the bed surface and a second depth 15 lower than the first depth 14 in a series of depressions, or "canals" 16, extending in the wetland 10. The canals 16 preferably have a second area 18 that is substantially smaller than the first area 17. In this embodiment the draining is performed so that the water surface 13' is sufficiently low to expose the bed surface to the first depth 14 but sufficiently high to retain water in the canals 16, leaving viable plants 11 in the canals 16.

The dried plant matter 11' is then tilled into the bed 12 using agricultural equipment such as is known in the art. The canals 16 are below the first depth 14, and are thus not tilled. If needed, a coagulant such as an aluminum-, iron-, and calcium-containing compound is added at this time to prevent subsequent re-release of nutrients that had been taken up by the plants 11 from the wetland 10.

Finally, the wetland 10 is then re-flooded, and the viable plants 11 remaining in the canals 16 are used as an inoculation source to begin the remediation cycle once again.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A method of managing wetland biomass comprising the steps of:
    at least partially draining a body of water having a plurality of wetland plants growing therein for removing pollutants in the body of water;
    permitting the wetland plants to dry;
    tilling at least some of the dried wetland plants into a bottom of the body of water; and
    re-flooding the body of water.

2. The method recited in claim 1, wherein the body of water comprises a constructed wetland.

3. A method of managing wetland biomass comprising the steps of:
    at least partially draining a body of water having a plurality of wetland plants growing therein for removing pollutants in the body of water, wherein the body of water has a bed, the bed having a first depth over a first area of the bed and a second depth greater than the first depth over a second area of the bed, the second area substantially greater than the first area, the draining step comprising draining the body of water to a level deeper than the first depth and shallower than the second depth;
    permitting wetland plants exposed by the draining step to dry;
    tilling at least some of the dried wetland plants into a bottom of the body of water; and re-flooding the body of water.

4. The method recited in claim 3, wherein the second area comprises a plurality of elongated canals.

5. The method recited in claim 3, wherein the re-flooding step comprises re-inoculating the body of water with wetland plants retained in water remaining above the bed in depressions located over the second area during the draining, permitting, and tilling steps.

6. A method of managing wetland biomass comprising the steps of:
- at least partially draining a body of water having a plurality of wetland plants growing therein for removing pollutants in the body of water;
- permitting the wetland plants to dry;
- adding a chemical coagulant to a bed of the body of water for preventing a re-release of nutrients into water introduced by the re-flooding step;
- tilling at least some of the dried wetland plants into a bottom of the body of water; and
- re-flooding the body of water.

7. The method recited in claim 6, wherein the chemical coagulant is selected from a group consisting of an aluminum-, iron-, and calcium-containing compound.

8. A constructed wetland comprising:
- an enclosure adapted to hold water and wetland plants for pollutant- and excess-nutrient-removal treatment, the enclosure having a soil bed, the bed having a first depth over a first area of the bed and a second depth greater than the first depth over a second area of the bed, the first area substantially greater than the second area; and
- means for draining the enclosure to a level deeper than the first depth and shallower than the second depth, for drying wetland plants atop the first area and for retaining wetland plants atop the second area in a hydrated state.

9. The wetland recited in claim 8, wherein the second area comprises a plurality of elongated canals.

10. The wetland recited in claim 8, further comprising means for re-flooding the enclosure.

11. The wetland recited in claim 10, further comprising means for adding a chemical coagulant following a drainage thereof, for preventing a re-release of nutrients into water introduced by the re-flooding means.

* * * * *

UNITED STATES PATENT AND TRADEMARK OFFICE
CERTIFICATE OF CORRECTION

PATENT NO. : 7,074,330 B1  Page 1 of 1
APPLICATION NO. : 10/770184
DATED : July 11, 2006
INVENTOR(S) : Thomas A. DeBusk It is certified that error appears in the above-identified patent and that said Letters Patent is hereby corrected as shown below:

In Claim 3, lines 59-60 of col. 2, please change "the second area substantially greater than the first area" to --the second area substantially smaller than the first area.--

Signed and Sealed this

Sixth Day of March, 2007

JON W. DUDAS
*Director of the United States Patent and Trademark Office*